(12) United States Patent
Milcheck

(10) Patent No.: US 10,689,555 B1
(45) Date of Patent: Jun. 23, 2020

(54) FORMULATION TO STOP THE ADHERENCE OF A DYE TO AN EGGSHELL

(71) Applicant: Kevin James Milcheck, Mount Dora, FL (US)

(72) Inventor: Kevin James Milcheck, Mount Dora, FL (US)

( * ) Notice: Subject to any disclaimer, the term of this patent is extended or adjusted under 35 U.S.C. 154(b) by 190 days.

(21) Appl. No.: 15/732,770

(22) Filed: Dec. 26, 2017

Related U.S. Application Data

(60) Provisional application No. 62/498,507, filed on Dec. 27, 2016.

(51) Int. Cl.
*A23B 5/06* (2006.01)
*C09J 191/06* (2006.01)

(52) U.S. Cl.
CPC ............. *C09J 191/06* (2013.01); *A23B 5/06* (2013.01); *A23V 2002/00* (2013.01)

(58) Field of Classification Search
USPC ............. 426/250; 118/13; 106/271; 427/259, 427/272, 274
See application file for complete search history.

(56) References Cited

U.S. PATENT DOCUMENTS

| | | | | |
|---|---|---|---|---|
| 1,829,689 A | * | 10/1931 | Townley | B05D 1/32 426/300 |
| 1,952,612 A | * | 3/1934 | Edward | B44D 2/00 426/250 |
| 2,074,376 A | * | 3/1937 | Frances | B44D 2/00 426/250 |
| 2,593,566 A | * | 4/1952 | Kamp | C09D 189/06 106/144.1 |
| 4,181,745 A | * | 1/1980 | Growe | B44D 2/00 426/250 |
| 4,370,941 A | * | 2/1983 | Belton | B44D 3/24 118/13 |
| 4,371,555 A | * | 2/1983 | Tully | A23L 15/00 426/104 |
| 4,693,205 A | * | 9/1987 | Thill | B44C 1/04 118/13 |
| 4,798,162 A | * | 1/1989 | Nelson | B05C 3/09 118/26 |
| 4,853,240 A | * | 8/1989 | McShane | A23L 5/40 426/250 |
| 5,074,239 A | * | 12/1991 | Law | B44D 3/00 118/26 |
| 5,565,229 A | * | 10/1996 | Mandle | B44D 3/00 426/250 |
| 5,895,679 A | * | 4/1999 | Pender | A47G 19/28 118/13 |
| 6,260,480 B1 | * | 7/2001 | Bardeen | A47J 43/14 99/495 |
| 8,474,464 B2 | * | 7/2013 | Smith | A45D 34/042 132/200 |
| 2006/0076101 A1 | * | 4/2006 | Krivich | B29C 63/42 156/86 |
| 2010/0065208 A1 | * | 3/2010 | Roszak | E01H 1/12 156/308.2 |

* cited by examiner

*Primary Examiner* — Nina Bhat

(57) ABSTRACT

Dying Easter Eggs has not changed much in over the 100 years it has been around. There are many methods and products on the market today, but nothing has ever been introduced to stop a particular dye to adhere to an eggshell. This has many advantages, which could allow an individual to dye eggs in 1, 2, 3 or more colors. This would be accomplished through the use of stickers (which would eventually be removed) and an egg paste formulated to a soft, spreadable, wax like consistency for easy application to an eggshell. Once applied, it will block a food grade dye penetrating to the egg's surface with the ability for an individual to easily wipe off the eggshell.

21 Claims, No Drawings

FORMULATION TO STOP THE ADHERENCE OF A DYE TO AN EGGSHELL

BACKGROUND OF THE INVENTION

1. Field of the Invention

There are many different egg dying kits on the market today, allowing the consumer to design a vast array of different style Easter eggs. One thing that is missing from all these products is to allow a person to dye an egg in several colors with a vast array of intricate designs based on the sticker pack of designs that is provided. Sure, one could hold an egg and dye half the egg one color and half of the egg another color. One can even go as far as taping the egg and getting a fine line between the two colors. Currently, there are no products on the market today that include an egg dying paste that resists the dying of the egg.

2. Description of the Prior Art

The only relative product to this particular patent would be a wax crayon or melted wax, allowing a user to write on an egg to allow no dye to penetrate the eggshell. A very inefficient use as compared to this product, making it utterly impossible to achieve the same results.

One can also look at many products that offer or are resistant to water, for instance petroleum jelly. It offers some resistance to water and in effect a dye. The product itself does not prevent dye penetration to the level that is required, and also is not a material that should be recommended for consumption. Chapstick or similar could also offer some resistance, but does not have the level that is needed to resist a dye from penetrating through.

Utilizing sugar as a use to prevent water/dye penetration could not be found. There are several patents utilizing sugar as an adhesive and decreasing the actual solubility of the sugar that can have positive results if added to the mix.

For example, A method of producing an adhesive composition comprising: a. admixing sugar, water and a polyfunctional acid to form a mixture, wherein the molar ratio of sugar to water is in the range of 1:20 to 1:60 and the acid is present in the mixture in the range and the acid is present in the mixture at a level of about 5-14% by weight; b. heating said mixture to boiling temperature; c. maintaining the mixture at boiling temperature until the sugar is substantially cross-linked by the acid to yield said adhesive composition having a Gardner Bubble Viscosity number within the range of 8.3 to 8.7 at 61.degree. C. U.S. Pat. No. 6,613,378 Authored by: Erhan; Selim M. (Peoria, Ill.), Erhan; Sevim Z. (Peoria, Ill.), Eskins; Kenneth (late of Laura, Ill.).
also stated in this patent are related patents as follows:

Edible adhesives and adhesives generally regarded as safe (GRAS) are well known for applications wherein consumption of the adhesive or-even possible oral contact is a consideration. For example, Fischer (U.S. Pat. No. 5,851,512) teaches a sticky dental composition comprising a tackifying agent comprising carboxypolymethylene, gums, proteins, or mixtures capable of adhering and temporarily retaining a dental tray over a person's teeth.

Guarino et al. (U.S. Pat. No. 4,360,551) shows a flexible film laminate especially adapted for use in the construction of a retortable food pouch for the packaging of food wherein the layers of the pouch are bonded together by an adhesive comprising a maleic acid anhydride adduct of ethylenepropylene copolymer.

Scrimager (U.S. Pat. No. 6,077,551) teaches an expandable microwave popcorn package wherein panels of the package-are bonded together by a releasable adhesive whose bonding strength will be diminished by the heat and steam generated by the popping process. Adhesives contemplated by Guarino et al. include water based vinyl acetate, water based rubber latex, water-based acrylic complexes, and water-based blends of elastomeric emulsions.

Batterman et al. (U.S. Pat. No. 4,737,368) teach sweetener compositions comprising a mixture of a mono- and di-saccharide that allows for reduced usage of food-grade acids in sucrose-sweetened foods. Among other applications, these compositions may be used for denture-retaining adhesives.

Yamamura et al. (U.S. Pat. No. 5,914,118) is drawn to a multi-layered drug containing film preparation for administration to the oral cavity, and having powdery adhesive on the side of the film opposite the drug-containing layer. The adhesive compound is one or more polyhydroxy polymer or non-toxic, pharmaceutically acceptable salts thereof, such as carboxymethylcellulose, pullulan, povidone, karaya gum, pectin, xanthan gum, tragacanth, arginic acid and gum arabic.

Keough et al. (U.S. Pat. No. 5,895,673) teaches a snack food dispensing utensil useful for picking up and delivering food to the mouth of a consumer. In one embodiment, the utensil uses a flavored adhesive material coating comprising sucrose- or fructose-based substance to prevent messy residue from being deposited on the consumer's hands. The coating is not tacky at room temperatures, but softens and becomes sticky or tacky when heated.

What is not apparent from the prior art is taking these findings and adding these materials to materials listed in this patent to formulate an easy to wipe on material to the surface of an eggshell to stop a dye from penetrating the surface. The formulations are vast that can be utilized for the sugar/sugar alcohol component, along with the particular oils and wax chosen, with surprising similar results. With a concern of limiting microbial and fungal contamination and growth in the material, a sugar alcohol or a combination of sugar alcohols are being pursued in this patent. Sugar alcohols have influence in lowering the water activity of edibles and its high osmotic pressure lead to an increased preservative effect.

SUMMARY OF THE INVENTION

The present invention relates to the ability to dye an Easter egg in 1, 2, 3, or more colors. The design of each egg depending on the removeable stickers provided along with a special egg paste designed to not allow the penetration of the dye to the egg shell surface.

It is the object of this invention to produce a food grade Egg Paste to allow ease of application and clean-up and to allow a user to decorate an egg in 1, 2, 3 or more colors. To include an egg paste, which is formulated to act as a "glue" that can be used to adhere an egg to our specially designed Patent Pending egg holder.

DESCRIPTION OF THE INVENTION

The goal of the invention is to soften the wax in the mix and to be able to increase the amount of wax in an individual mix, thus increasing the effectiveness of the product as a whole, plus increasing the barrier between the eggshell and the dye.

Once heat is applied, all samples need to be stirred constantly to avoid hot spots and precipitating the mixture.

The process of making the a coating which is applied to the surface of the egg shell using a fingertip and body heat associated with using a fingertip to apply the coating to the egg shell prevents or eliminates penetration of food dyes on an egg shell. Specifically the method of eliminating the penetration of food dyes on egg shell surface is accomplished by making a coating which includes the steps of a.) admixing, a hydroxide, a sulfate and water wherein the ratio of hydroxide to water is 1:1 to 1:10 to form a solution; b.) determining the pH and optionally adding a an acid to lower the pH of the solution; c.) adding a sugar alcohol in an amount of up to 60% of the total weight percent of the solution; d.) adding a food grade emulsifier and fatty acid to the solution; e.) heating the solution to a temperature between 135-200° F. and adding a food grade wax; and f.) cooling the coating so it may be applied onto the egg shell surface to prevent color intrusion. The specific type of sulfate and hydroxides in the coating may include magnesium sulfate, sodium sulfate and potassium sulfate and combinations thereof and potassium hydroxide and sodium hydroxide and combinations thereof. The polyfunctional acids used in making the coating may include citric, glycolic, lactic, malic, tartaric, mandelic, fumaric, and phosphoric acids. The specific types of sugar alcohols which can be used in the coating may include of arabitol, erythritol, glycitol, lactitol, maltitol, mannitol, sorbitol, xylitol. The specific types of food emulsifiers may include monoglyceride fatty acid esters including acetic acid, lactic, citric acid, succinic acid, diacetyl tartaric acid, polyceroucinic acid esters and diacetyl tartaric acid monoglyceride fatty acids. Other food grade emulsifiers include polyglycerol ester, polyglycerol polyricinoleate, sorbitrate ester, polypropylene glycol, sucrose esters and lecithin, the types of lecithins contemplated include one or more of soy, milk, egg, rapeseed, cotton seed, sunflower, peanut and wheat germ. The fatty acids which are used with the emulsifier may include the following edible oils sunflower oil, soybean oil, corn oil, cottonseed oil, canola oil, coconut oil, olive oil, palm oil, peanut oil, safflower oil, sesame seed oil, sunflower oil, hazelnut oil, almond oil, cashew oil, macadamia oil, pecan oil, pistachio oil, walnut oil, lagenaria siceraria oil, buffalo gourd oil, pumpkin seed oil, watermelon seed oil, acai oil, black currant seed oil, borage seed oil, evening primrose oil, carob pod oil, apricot oil, argan oil, artichoke oil, avocado oil, babassu oil, ben oil, borneo tallow nut oil, cohune oil, coriander seed oil, hemp oil, kapok seed oil, lallemantia oil, meadowfoam seed oil, mustard oil, okra seed oil, hibiscus esculentus oil, perilla seed oil, pine nut oil, poppyseed oil, prune kernal oil, quinoa oil, ramtil oil, rice bran oil, tea oil, thistle oil, wheat germ oil, caprylic acid, capric acid, lauric acid, cyristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, a-Linolenic acid, arachidonic acid, eicosapentaenoic acid, docosahexaenoic acid and mixtures thereof. The types of food grade waxes may include beeswax, carnuba wax. candellia wax, and paraffin wax.

An adhesive composition is also contemplated and used in eliminating the penetration of food grade dyes when coloring or dying eggs. The composition is made by the process of a.) admixing sugar, water and a polyfunctional acid to form a mixture, wherein the molar ratio of sugar to water is in the range of 1:2 to 1:60 and the acid is present in the mixture at about 2-16% by weight; b.) heating the mixture to boiling temperature; c.) maintaining the mixture at boiling temperature until the sugar is substantially cross-linked by the acid to yield the adhesive composition. The types of sugar used in the adhesive composition may include one or more of sucrose, lactose, maltose and cellobiose, glucose, fructose, mannose, arabinose, sorbitol and combinations thereof.

The process of coloring eggs or dying eggs which include the coating and/or adhesive composition as described above is as follows: A method of using the adhesive for eliminating penetration of food dyes on an egg shell surface by applying a coating to the egg shell surface wherein the process includes: making the coating by a.) admixing, a hydroxide, a sulfate and water wherein the ratio of hydroxide to water is 1:1 to 1:10 to form a solution; b.) determining the pH level of the solution and optionally adding an acid to lower the pH of the solution; c.) adding a sugar alcohol in an amount of up to 60% of the total weight percent of the solution; d.) adding a food grade emulsifier and fatty acid to the solution; e.) heating the solution to a temperature between 135-200° F. and adding a food grade wax; and f.) adding the adhesive; and g.) cooling the solution to produce the coating for application onto the egg shell surface.

The method of producing a multiple colored egg by applying the coating is as follows: a.) applying at least one sticker to the egg shell; b.) dipping the egg in food grade food coloring of a color; c.) applying the coating to the egg shell by fingertip utilizing body heat to soften the wax and allow ease of application; d.) removing the at least one sticker; and e.) dipping the egg in food grade food coloring of a different color to produce a multicolored egg; wherein steps b) through e) are repeated as desired.

Example 1

An Egg Paste composition produced by the process of claim 1. Utilizing sodium hydroxide at 2 grams while mixing in 4.5 grams of distilled water. Add 8 grams of magnesium sulfate(heptahydrate) while mixing for complete dissolution of the magnesium sulfate(heptahydrate). Lowering the ph to a more acceptable level by adding 2 grams of citric acid. Add 2 grams of maltitol, and mix . . . . It is not necessary to incorporate fully in the mix at this point. Add 10 grams of soy lecithin along with 20 grams of refined coconut oil. Heat material to 170 degrees F. and incorporate 15 grams of unbleached beeswax along with 5 grams lauric acid. Let cool.

In the example above, maltitol is readily water soluble allowing one to easily incorporate the maltitol into the mixture early, and not requiring the maltitol to be heated before being incorporated into the mix.

The example gives one form of the wax that can be adjusted for feel by adding additional wax in the form of beeswax or other edible wax, or lauric acid, myristic acid, palmitic acid or similar depending on whether a stiffening or a loosening of the material is required. The addition of maltitol or similar sugar alcohol in a lesser or more degree has a distinct effect on the spreadability of the wax as does the specific polyfunctional acid utilized and the amount. One can also delve into the immense possibilities of the admixtures of the sugars and polyfunctional acids as stated in claim 21 and specifically looked at in U.S. Pat. No. 6,613, 378 Authored by: Erhan; Selim M. (Peoria, Ill.), Erhan; Sevim Z. (Peoria, Ill.), Eskins; Kenneth (late of Laura, Ill.).

The requirements of an effective wax are truly vast, given the basic ingredients added in the mix with surprisingly very similar results. It would take years to fully delve into every possibility that arises out of these potential ingredients, geared to a single outcome, namely a wax to resist an egg dye.

One essential fact of formulating this egg paste is the resistance to pull away one's finger from the egg and in essence pull some of the wax away from the surface of the egg. In essence, allowing a path for the dye to seep on the egg. There is a vast array of formulations using the basic ingredients to eliminate this action from occurring.

Another important aspect of the wax, it has to be formulated to have glue like qualities. This is important, because of the patent pending egg holder that is sold along side with the egg paste. An egg holder which relies on the adhesive qualities of the egg paste to hold an egg onto it's egg stand. The qualities of the wax, actually allow a user to turn the egg holder on its side and even upside down, without the egg falling off of the egg stand. Without the qualities of the wax possessing adhesive qualities, the egg would easily fall off the egg stand and damage one's Color Me Cool Egg design!

The formulation shown, does not necessarily need a food grade preservative or combination of, to provide a product free of fungus and microbial growth. There are formulations that could require microbial growth and fungus protection given the degree of water incorporated and polyfunctional acids utilized. Also, if one delves into the addition of the admixture containing sugar and polyfunctional acids as stated in claim 21. A number of different preservatives may be used depending on the final formulation of the egg paste and ph, not limited to sorbates, benzoates, sulfites, butylated hydroxytolen and natural preservatives.

SOURCES

U.S. Pat. No. 6,613,378 Authored by: Erhan; Selim M. (Peoria, Erhan; Sevim Z. (Peoria, Ill.), Eskins; Kenneth (late of Laura, Ill.). A method of producing an adhesive composition comprising: a. admixing sugar, water and a polyfunctional acid.

Fischer (U.S. Pat. No. 5,851,512) teaches a sticky dental composition comprising a tackifying agent comprising carboxypolymethylene, gums, proteins, or mixtures capable of adhering and temporarily retaining a dental tray over a person's teeth.

Guarino et al. (U.S. Pat. No. 4,360,551) shows a flexible film laminate especially adapted for use in the construction of a retortable food pouch for the packaging of food wherein the layers of the pouch are bonded together by an adhesive comprising a maleic acid anhydride adduct of ethylene-propylene copolymer.

Scrimager (U.S. Pat. No. 6,077,551) teaches an expandable microwave popcorn package wherein panels of the package-are bonded together by a releasable adhesive whose bonding strength will be diminished by the heat and steam generated by the popping process. Adhesives contemplated by Guarino et al. include water based vinyl acetate, water based rubber latex, water-based acrylic complexes, and water-based blends of elastomeric emulsions.

Batterman et al. (U.S. Pat. No. 4,737,368) teach sweetener compositions comprising a mixture of a mono- and di-saccharide that allows for reduced usage of food-grade acids in sucrose-sweetened foods. Among other applications, these compositions may be used for denture-retaining adhesives

What is claimed is:

1. A method of making a coating for use in reducing penetration of food dyes on an egg shell surface, the method comprising:

a.) admixing, a hydroxide, a sulfate and water wherein the ratio of hydroxide to water is 1:1 to 1:10 to form a solution;
   b.) determining the pH level of the solution and optionally adding an acid to lower the pH of the solution;
   c.) adding a sugar alcohol in an amount of up to 60% of the total weight percent of the solution;
   d.) adding a food grade emulsifier and fatty acid to the solution;
   e.) heating the solution to a temperature between 135-200° F. and adding a food grade wax; and
   f.) cooling the solution to produce the coating for application onto the egg shell surface.

2. The method of claim 1, wherein the sulfate is selected from the group consisting of magnesium sulfate, sodium sulfate and potassium sulfate and combinations thereof.

3. The method of claim 1, wherein the hydroxide is selected from the group consisting of potassium hydroxide and sodium hydroxide.

4. The method of claim 1, wherein the acid is a polyfunctional acid is selected from the group consisting of citric, glycolic, lactic, malic, tartaric, mandelic, fumaric, and phosphoric.

5. The method of claim 1, wherein the acid is citric acid.

6. The method of claim 1, wherein step a.) comprises admixing sodium hydroxide and magnesium sulfate to form the solution.

7. The method of claim 1, wherein the food grade emulsifier comprises monoglyceride fatty acid esters selected from the group consisting of acetic acid, lactic, citric acid, succinic acid, diacetyl tartaric acid, polycerouccinic acid esters and diacetyl tartaric acid and combination thereof.

8. The method of claim 1, wherein the food grade emulsifier is selected from the group consisting of polyglycerol ester, polyglycerol polyricinoleate, sorbitate ester, polypropylene glycol, sucrose esters and lecithin and combination thereof.

9. The method of claim 8, wherein the food grade emulsifier is a lecithin selected from the group consisting of soy, milk, egg, rapeseed, cotton seed, sunflower, peanut and wheat germ and combination thereof.

10. The method of claim 1, wherein the food grade emulsifier is egg lecithin.

11. The method of claim 1, wherein the food grade emulsifier is soy lecithin.

12. The method of claim 1, wherein the fatty acid is an edible oil selected from the group consisting of sunflower oil, soybean oil, corn oil, cottonseed oil, canola oil, coconut oil, olive oil, palm oil, peanut oil, safflower oil, sesame seed oil, sunflower oil, hazelnut oil, almond oil, cashew oil, macadamia oil, pecan oil, pistachio oil, walnut oil, lagenaria siceraria oil, buffalo gourd oil, pumpkin seed oil, watermelon seed oil, acai oil, black currant seed oil, borage seed oil, evening primrose oil, carob pod oil, apricot oil, argan oil, artichoke oil, avocado oil, babassu oil, ben oil, borneo tallow nut oil, cohune oil, coriander seed oil, hemp oil, kapok seed oil, lallemantia oil, meadowfoam seed oil, mustard oil, okra seed oil, hibiscus esculentus oil, perilla seed oil, pine nut oil, poppyseed oil, prune kernal oil, quinoa oil, ramtil oil, rice bran oil, tea oil, thistle oil, wheat germ oil, caprylic acid, capric acid, lauric acid, cyristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, a-Linolenic acid, arachidonic acid, eicosapentaenoic acid, and docosahexaenoic acid.

13. The method of claim 1, wherein the fatty acid is coconut oil.

14. The method of claim 1, wherein the food grade wax is selected from the group consisting of beeswax, carnuba wax, candellia wax, and paraffin wax.

15. The method of claim 1, wherein the food grade wax is unbleached beeswax.

16. The method of claim 1, wherein the sugar alcohol is selected from the group consisting of arabitol, eythritol, glycitol, lactitol, maltitol, mannitol, sorbitol, and xylitol.

17. The method of claim 1, wherein the sugar alcohol is maltitol.

18. A method of using an adhesive in a coating for eliminating penetration of food dyes on an egg shell surface, the method comprising:
  a.) admixing, a hydroxide, a sulfate and water wherein the ratio of hydroxide to water is 1:1 to 1:10 to forma solution;
  b.) determining the pH level of the solution and optionally adding an acid to lower the pH of the solution;
  c.) adding a sugar alcohol in an amount of up to 60% of the total weight percent of the solution;
  d.) adding a food grade emulsifier and fatty acid to the solution;
  e.) heating the solution to a temperature between 135-200° F. and adding a food grade wax;
  f.) adding an adhesive to the solution, including producing the adhesive by:
    admixing sugar, water and a polyfunctional acid to form a mixture, wherein the molar ratio of sugar to water is in the range of 1:2 to 1:60 and the acid is present in the mixture at about 2-16% by weight,
    heating the mixture to boiling temperature, and
    maintaining the mixture at boiling temperature until the sugar is substantially cross-linked by the acid to yield the adhesive composition; and
  g.) cooling the solution to produce the coating for application onto the egg shell surface.

19. The method of claim 18 where the sugar is selected from the group consisting of sucrose, lactose, maltose and cellobiose, glucose, fructose, mannose, arabinose, and sorbitol.

20. The method of claim 18, wherein the polyfunctional acid is selected from the group consisting of citric, glycolic, lactic, malic, tartaric, mandelic, fumaric, and phosphoric.

21. The method of producing a multiple colored egg by applying the coating as prepared by claim 1, comprising:
  a.) applying at least one sticker to the egg shell;
  b.) dipping the egg in food grade food coloring of a color;
  c.) applying the coating to the egg shell by fingertip utilizing body heat to soften the wax and allow ease of application;
  d.) removing the at least one sticker; and
  e.) dipping the egg in food grade food coloring of a different color to produce a multicolored egg;
  wherein steps b) through e) are repeated as desired.

* * * * *